Oct. 29, 1935.  H. W. RUPPEL  2,019,155
MULTIPLE SPINDLE HYDRAULIC SCREW MACHINE
Filed May 24, 1933   7 Sheets-Sheet 5

Inventor
HARRY W. RUPPEL
By Richey & Watts
Attorneys

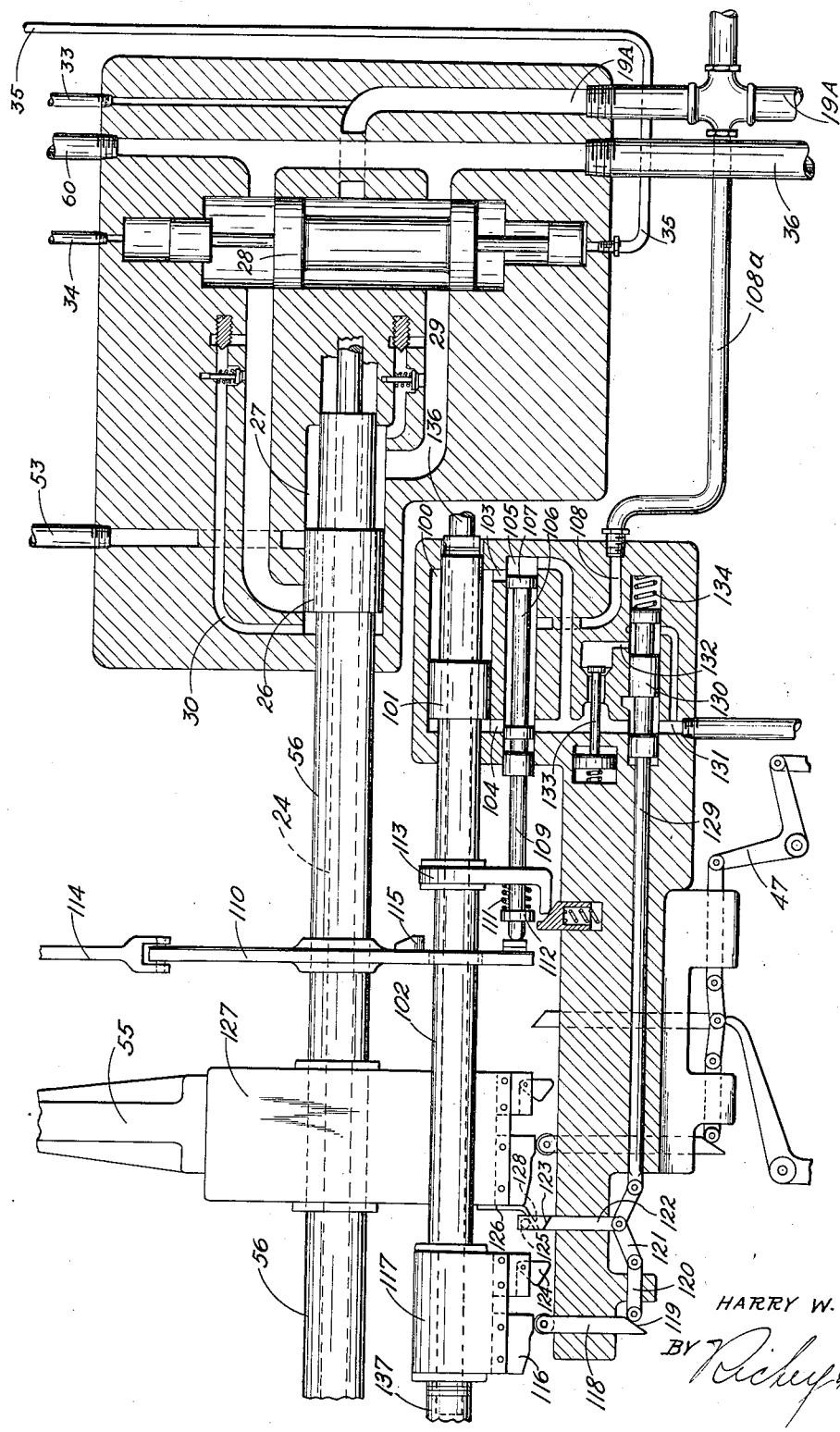

Patented Oct. 29, 1935

2,019,155

UNITED STATES PATENT OFFICE 2,019,155

MULTIPLE SPINDLE HYDRAULIC SCREW MACHINE

Harry W. Ruppel, Shaker Heights, Ohio, assignor to The Cleveland Automatic Machine Company, Cleveland, Ohio, a corporation of Ohio Application May 24, 1933, Serial No. 672,603

23 Claims. (Cl. 29—37)

This invention relates to fluid operated lathes and more specifically to multi-spindle screw machines and an improved hydraulic transmission mechanism therefor.

This application is a continuation in part of a copending application filed January 25, 1933, Serial No. 653,432, entitled "Automatic lathe" wherein a hydraulic transmission mechanism for effecting the translation of the cutting tools is disclosed in conjunction with a single spindle turret lathe. The present invention contemplates a hydraulic driving mechanism for a multi-spindle lathe which embodies, in addition to certain basic features of construction disclosed in the aforesaid application, an improved and more comprehensive organization of mechanisms including a fluid operated transmission for rotatively driving the work holding spindles, an automatic stock feed and chucking mechanism therefor, and a hydraulic indexing device constructed to revolve the work holding spindles into operative position for successive engagement with the aligned and cross slide tools and operatively coordinated for cyclic control therewith.

The invention is further directed toward an improved tool actuating device embodied within the tool slide, and organized for independent reciprocative movement therewith, the control mechanism therefor being operably dependent upon the fluidic displacement of a tool actuating device of antecedent operation.

Other objects and advantages reside in the specific construction and aggroupment of elements peculiar to the structure embodying the present invention, as will become apparent from a more complete examination of the following specification and appended claims wherein there is assembled and pointed out certain combinations of parts and specific constructions indicative of the scope and spirit of the invention.

In the drawings which illustrate the preferred embodiment of the invention—

Figure 7 is a diagrammatic view illustrating a fragmentary portion of the fluid circulatory connection shown in Figure 6 but illustrated upon a somewhat enlarged scale.

Figure 1:
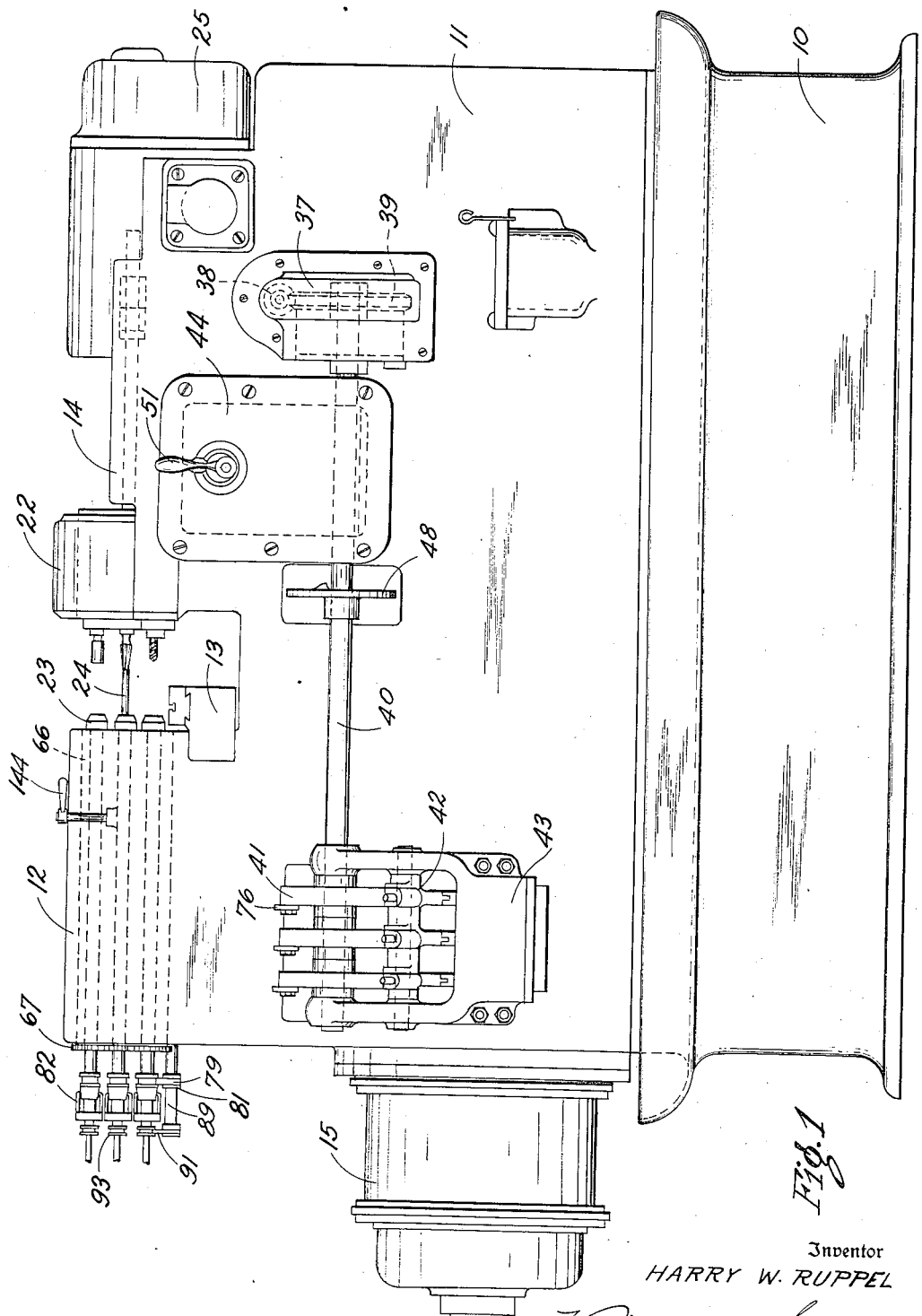
Figure 1 is a front elevational view of a multi-spindle screw machine embodying the hydraulic spindle drive and tool actuating mechanisms.
Figure 2:
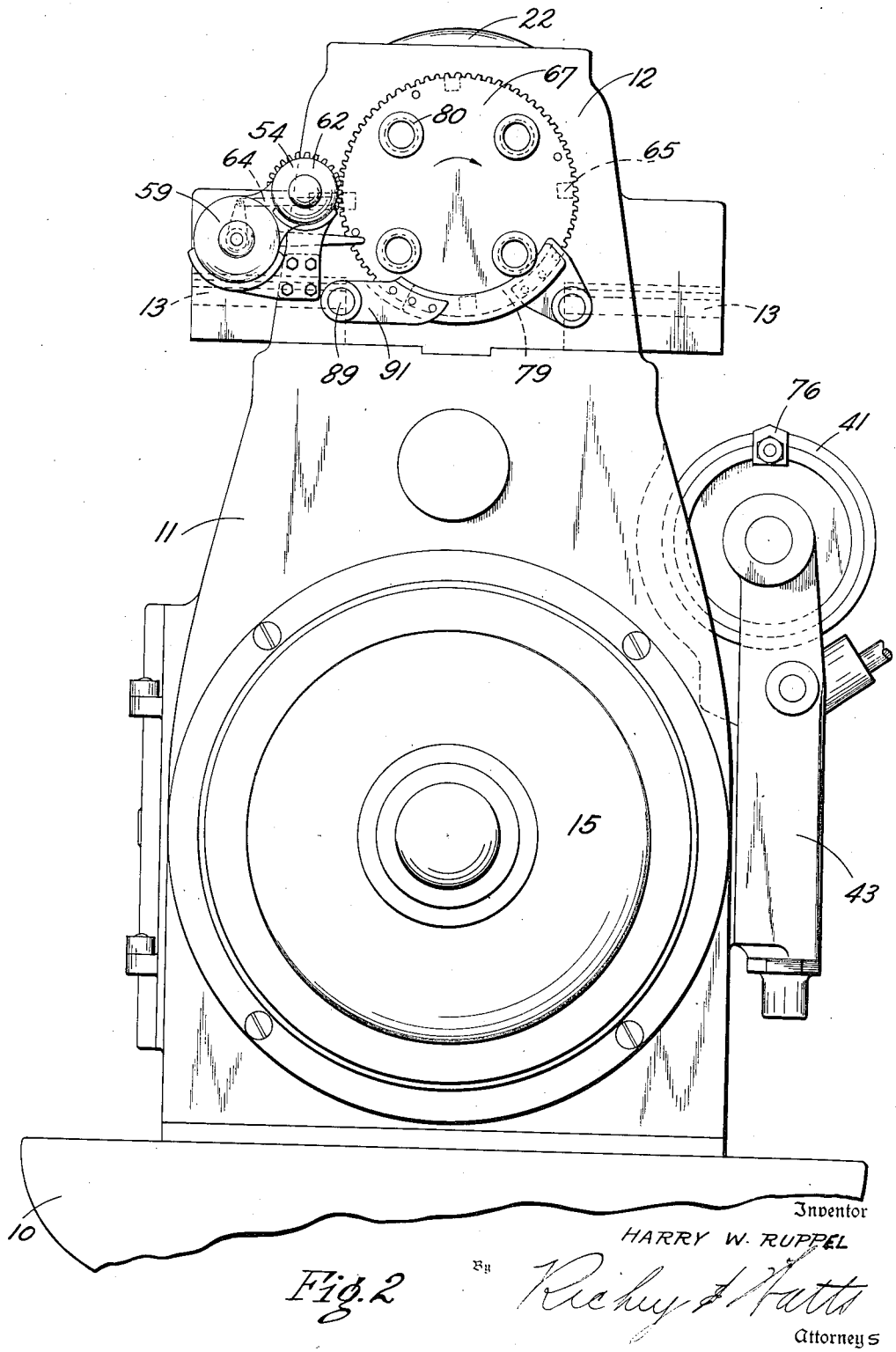
Figure 2 is an end elevational view of the machine illustrating the structure and arrangement of the stock carrying spindles.
Figure 3:
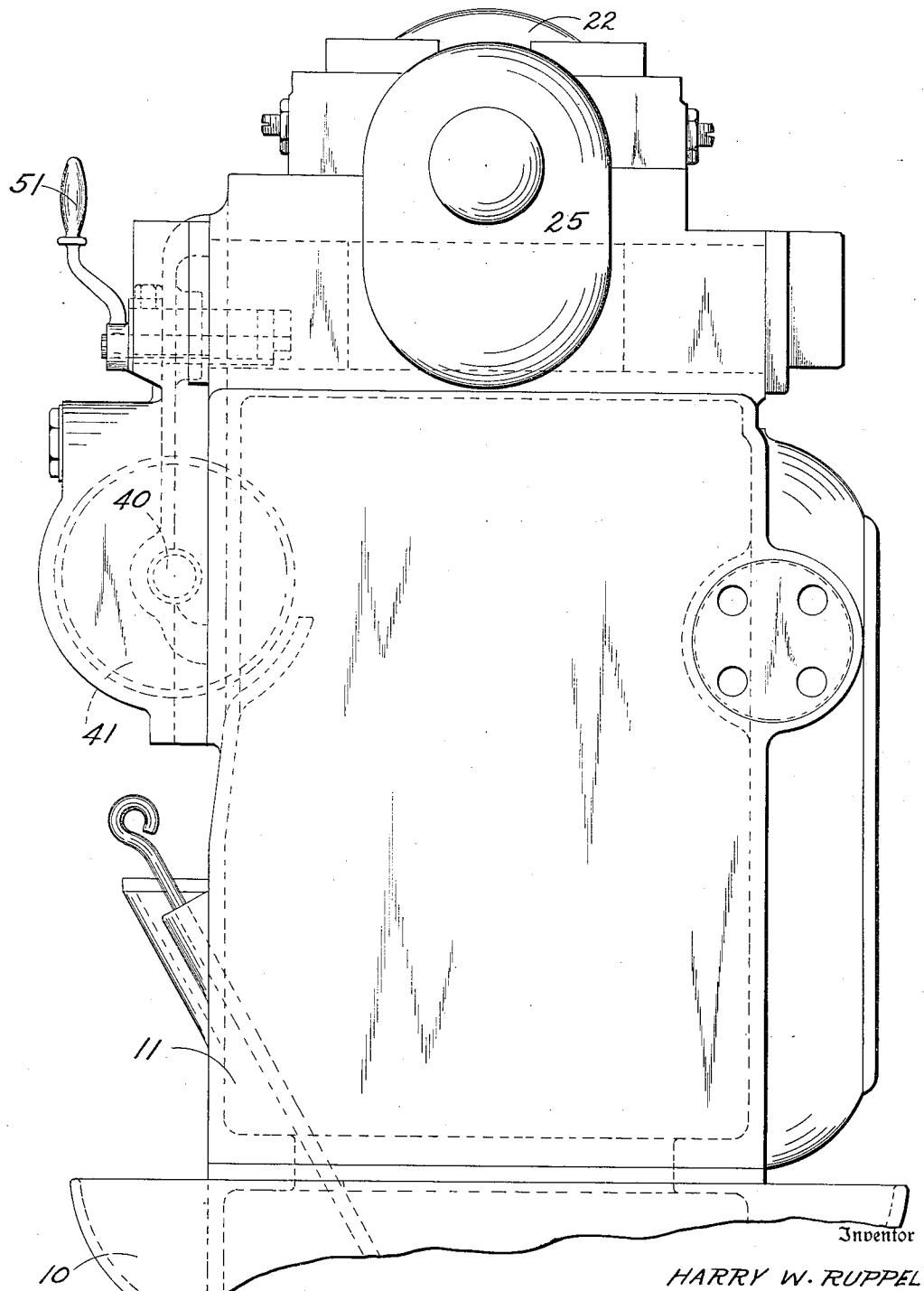
Figure 3 is an elevational view of the opposite end of the machine showing the position of the turbine for driving the work holding spindles and independently reciprocal tool holder shaft.
Figure 4:
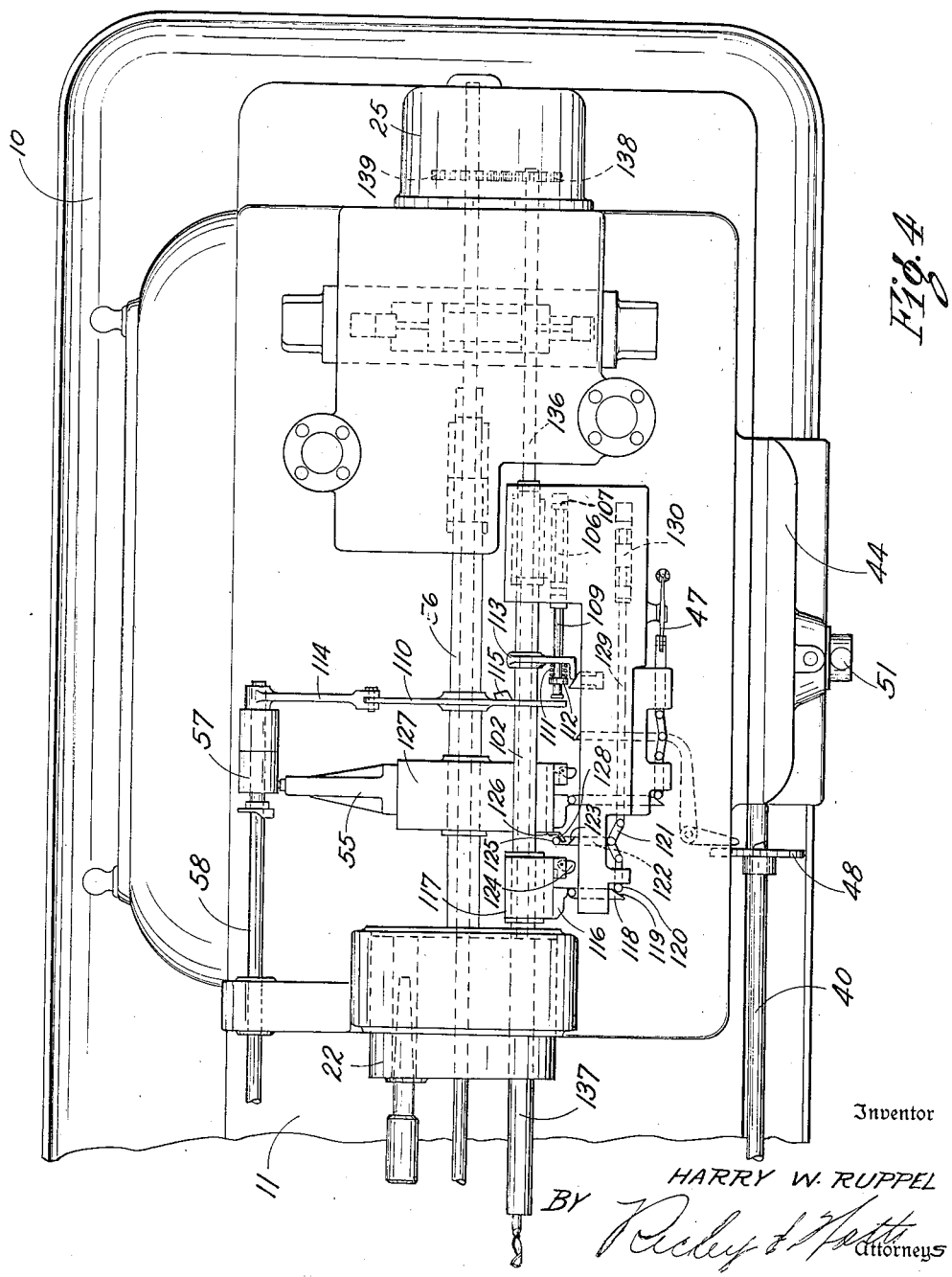
Figure 4 is a plan view of the end portion of the machine containing the turret and coordinated controls.
Figure 5:
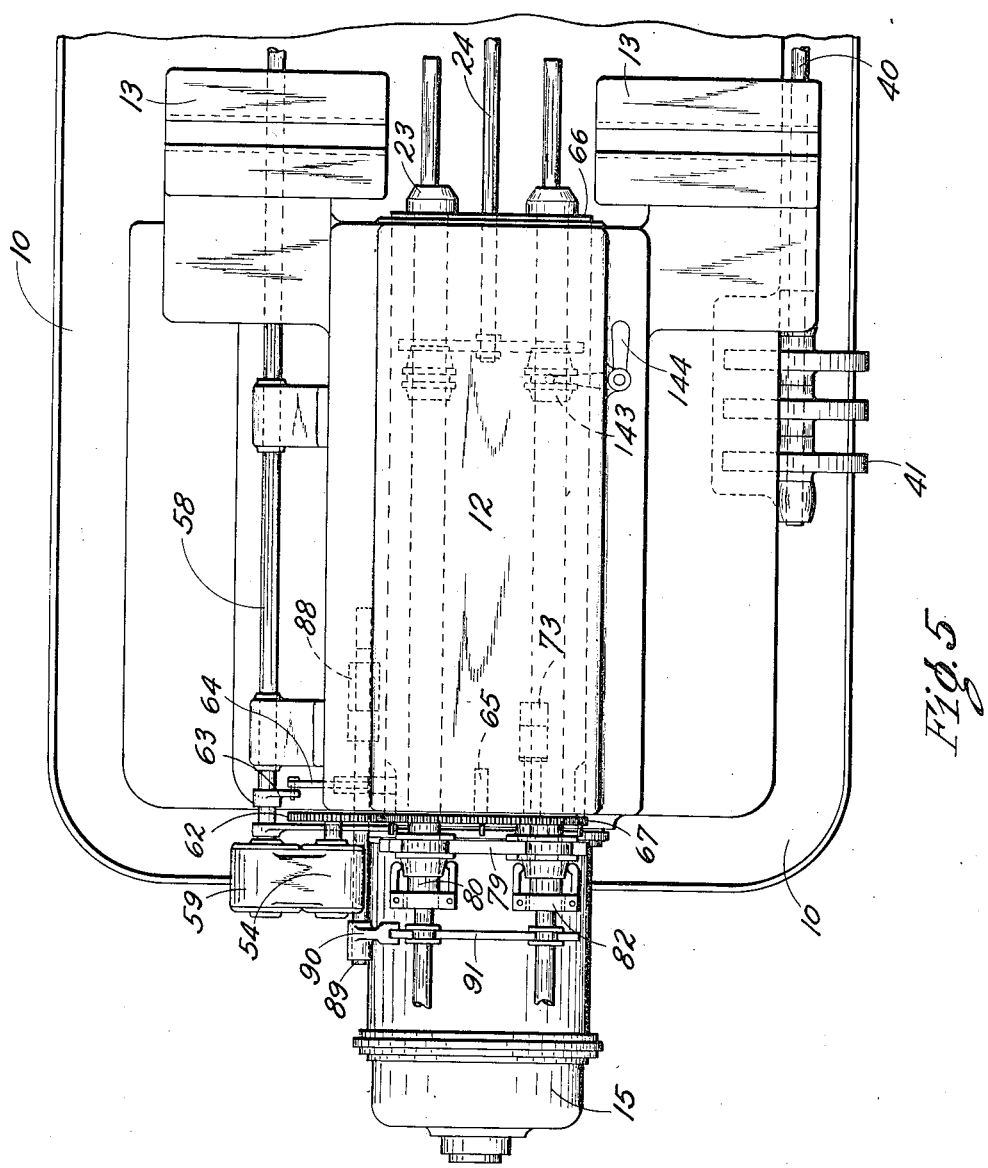
Figure 5 is a plan view of the opposite end of the machine illustrating the work holding spindles and their appurtenances.
Figure 6:
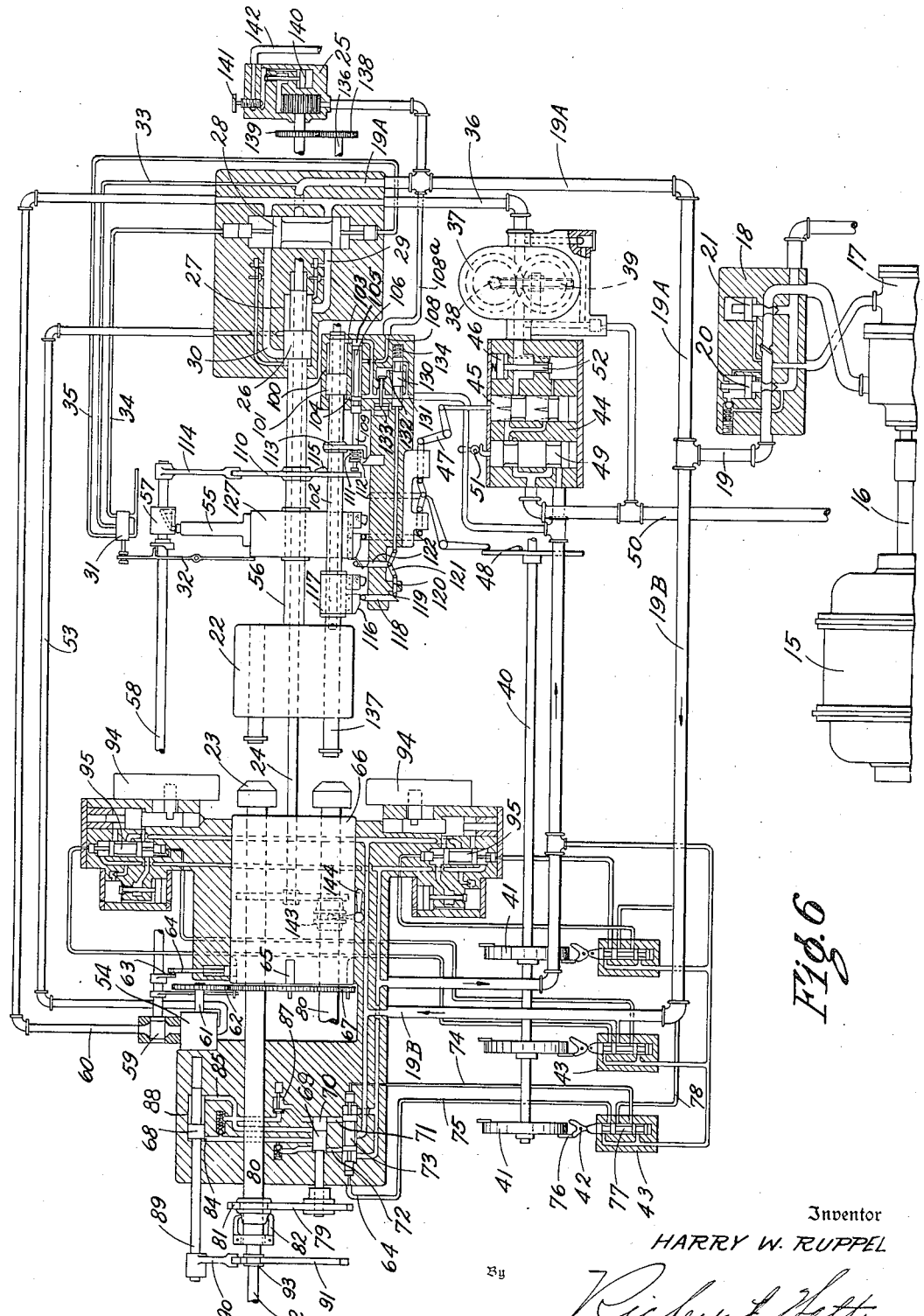
Figure 6 is a diagrammatic view illustrating the fluid circulatory connections and the correlation of the actuating mechanisms and control members therefor.

Referring in detail to the construction illustrated, the improved lathe embodies a base 10 having a bed 11 thereon which is formed with a spindle head housing 12, cross slideways 13 and a tool slide support 14. The bed is constructed to support a motor 15 in one of the end walls thereof, which motor is operatively connected to a shaft 16 (Figure 6) arranged to drive a pump unit 17. The pump is in fluid communication with a regulator valve 18 which, as fully disclosed in the copending application, is adapted to deliver fluid under pressure to a conduit 19 having a branch 19a leading to the tool slide operating mechanism and driving turbine and a branch 19b connected with the controls for the cross slides, stock feed and chuck actuating members. The regulator valve 18 embodies a pair of by-pass valve members 20 and 21 organized to effect the automatic delivery of fluid under pressure to the various actuating units in the circulatory system and organized to throttle the volume of fluid passing therethrough when certain of these units are inoperative or require a lesser volume of motive fluid. More specifically the regulator valve 18 is adapted to maintain a constant pressure to the delivery conduits 19a and 19b irrespective of the volumetric demands of the various units within the machine.

The tool slide 22 in the instant case is constructed to reciprocate to and from the work holding spindles 23 which are rotatively driven and progressively indexed for cyclic engagement with the turret tools. The spindles 23 are driven through planetary gearing by a shaft 24 which is rotated by a turbine 25 impelled by fluid under pressure delivered through the branch conduit 19a. The reciprocative movement of the tool slide 22 is effected through a piston 26 disposed within a cylinder 27 and operated therein by fluid under pressure controlled by a reciprocating shuttle valve 28 which is organized to admit fluid to the rearward end of the cylinder through a canal 29 and thus effect the outward translation of the piston and to admit fluid to the forward end of the cylinder through a canal 30 to retract the piston.

The actuation of the shuttle valve 28 is effected through a secondary valve or control unit 31 operatively adjusted through a cam and linkage 32 responsive to the reciprocative movement of the slide. The valve 31 comprises a housing having a chamber therein which is fed by a pressure line 33. Within the chamber there is a stem which is recessed to by-pass the fluid to the conduits 34 and 35 upon the reciprocated adjustment of the valve stem. Thus, fluid under pressure will be alternately admitted to the opposite ends of the cylinder which retains the shuttle valve 28 and thereby effect the reciprocation of the valve.

Upon the retraction of the piston 26 the fluid expelled from the cylinder 27 flows through the canal 29 and thence to a conduit 36 which communicates with a turbine 37. The fluid delivered to the turbine 37 effectuates the rotation of the impellers therein and thus drives a worm gear 38 and an intermeshed worm wheel 39 mounted upon a drive shaft 40. The drive shaft is disposed longitudinally across the forward face of the machine and is arranged to support and drive a series of cam discs 41 operatively associated with bell cranks 42 organized to control a series of valves 43 which govern the actuating mechanisms for the stock feed, chuck and cross slide units. The canals 29 and 30 are provided with adjustable check valves arranged to restrict the flow of fluid from the cylinders 27 adjacent the inner and outer stroke of the piston and thereby arrest the inertia forces of the piston during its reciprocative translation.

Adjacent the turbine 37 there is a feed regulating mechanism 44 which comprises a housing having cylinders 45 therein in one of which there is a sliding spool valve 46 having a tapered recess to permit the varied escapement of fluid therefrom when the valve is moved by the linkage 47 which is operatively connected with a cam 48 mounted upon the shaft 40. The housing for the feed regulating mechanism 44 also supports a shut-off cylinder which embodies a piston 49 operable to permit the passage of fluid in the circulatory system when the hand control throttle 51 is adjusted. Intermediate the cylinder 45 and the turbine 37 there is a spring loaded balance valve 52 which is provided to regulate the rotative movement of the impellers in the turbine when the valve 46 is positioned to restrict the flow of fluid therethrough.

*Multi-spindle control*

When the tool slide 22 is retracted from the work and the piston 26 disposed in the rearward end of the cylinder 27 the fluid under pressure in the conduit 19a will flow through the valve 28 and the canal 30 thus affording circulation of the pressure fluid to a conduit 53 which is connected to a spindle indexing turbine 54. During the retractive movement of the tool slide an arm 55, which is rigidly supported upon the piston connecting rod 56, will effect the rotative movement of a cam 57 and in turn the rotative movement of a shaft 58 which opens a gate valve 59 interposed in the line 60 in fluid communication with the turbine 54. When the gate valve 59 is opened and circulation through the turbine is initiated the impellers within the turbine will cause the rotation of the shaft 61 which supports an indexing pinion 62. During the rotation of the shaft 58 an arm 63 keyed thereto will be lifted and retract a latch pin 64 which is disposed for re-entrant engagement with slots 65 formed in the outer periphery of the work carrying turret 66. While the piston 26 is in its retracted position and fluid under pressure is delivered through the line 53 the turbine 54 will rotate the pinion 62 and drive a gear 67 which is affixed upon the outer end of the spindle turret 66. In the progression of the cycle the valves 31 and 28 are repositioned and when the piston 26 is traversed outwardly, fluid communication to the line 53 will be closed. Since the translation of the piston 26 effects the oscillating movement of the cam 57, shaft 58 and the valve 59, further rotative movement of the turbine 54 and spindle turret 66 is arrested when the piston is moved outwardly. The latch pin 64 is likewise adjusted, upon rotative movement of the shaft 58, to lock the spindle turret 66 against further movement in the indexing cycle.

*Stock chucking operation*

The stock feed mechanisms are controlled through fluid operated pistons 68 and 69 respectively which are impelled by fluid under pressure delivered through the conduit 19b. The piston 69 is mounted within a cylinder 70 which is provided with inlet and outlet openings 71 and 72, respectively, connected to a valve 73 which is actuated by fluid conducted through tubes 74 and 75 communicating with the coordinated valve 43. The cam plate 41 is provided with adjustable lugs 76 which are arranged to drive the bell cranks 42 and thus reciprocate a plunger 77 within the valve chamber 43 and distribute the fluid from the line 78 to the lines 74 and 75. As fluid is admitted to the respective end portions of the valve chamber 73 the sliding shuttle valve therein is reciprocated to alternately admit fluid into the inner and outer ends of the cylinder 70 and thus traverse a segmental shoe or quadrant 79 forward and rearwardly in relation to the spindle turret. The timed order of movement of the piston 69 as controlled by the fluid displaced from the cylinder 27 and in turn the valve 43 will cause the engagement of the shoes 79 at the proper interval in the operating cycle to effect the opening and closure of the chuck 23 concomitant with the retraction of the tools from the work. The outer ends of the spindle sleeves 80 are provided with grooved collars 81 which are disposed in relation to the shoe 79 to consecutively straddle the edge of the quadrant during the indexing cycle of the turret 66. Thus, when the piston 69 is reciprocated and the spindle turret is indexed the collar revolved into engagement with the shoe 79 will be traversed to cause the disengagement of the clutch 82 and the release of the chuck or collet 83 as is customary in work holding devices of similar character.

*Stock feed*

The actuation of the piston 69 controls the fluid passage through the canals 84 and 85 and through the by-pass valves 86 and 87 therein and furthermore effectuates the reciprocation of the piston 68 within the cylinder 88. The piston 68 is connected to a rod 89 having an arm 90 therein which supports a shoe 91 similar in character to the shoe 79. Upon the outer ends of the work holding spindles 92 there are grooved collars 93 which are disposed for consecutive engagement with the shoe 91 during the rotative indexing cycle of the spindle turret 66. When the shoe 91 is engaged with one of the collars 93 the fluid as governed by the actuation of the piston 26 and the control mechanism therefor will be admitted alternately to the forward and rearward ends of the cylinder 88 and cause the reciprocation of the piston 68 within the timed interval of the cycle provided for the operation of a stock feed mechanism as fully disclosed in the copending application, referred to heretofore.

Cross slides

In the instant case cross slides 94 are arranged in opposed relation to each other and are disposed for horizontal reciprocation adjacent the forward and rearward faces of the machine. These slides are controlled through hydraulic mechanisms 95 operatively connected with and controlled by the valves 43 and chuck operating valves 73 so that the timed order of operation occurs only during the desired interval of operation in the machining cycle. Moreover, the control mechanisms are arranged to retard or accelerate the movement of the cross slides when the correlated actuating devices are delayed or operated at a higher rate of speed within the operating cycle.

Independently reciprocal and rotatively driven holder tool

In a multi-spindle lathe of the type herein disclosed the work holding spindles are rotatively driven at constant speed and as is customary in such machines the tool slide is constructed with a given or fixed lineal travel at a predetermined rate of translation. It frequently occurs, however, that on one or more of the stations in the tool slide certain machining operation requirements exceed the time interval of the other timed tools and therefore an appreciable loss occurs when the slide is held to await the cutting time of the deep cutting or slowly fed tools. For example, in a four spindle machine the first tool station may be provided with a drill to perform a cut one-half the depth of the work, the second station a drill to cut the remaining stock; the third station, a reamer adapted to travel the entire depth of the drilled hole, while the fourth position may be occupied by a tap or similar tool, the cutting time whereof would be much greater than the first two stations.

In the machine constituting the present invention mechanism has been provided to equalize the operative period between tools having a short operative period and those having a heavy time burden. As illustrated the mechanism comprises a reciprocating tool holder supported within the tool slide and constructed for independent translation therein. It is to be understood, however, that a plurality of such mechanisms may be employed and that such modification is contemplated in the present application. The tool holder may also be rotatively driven, in the hand opposite that of the spindle, in order to expedite the cutting time and in turn the lineal feed thereof. The mechanism provided to control the rate of travel to and from the work during the cutting feed of the tool, contemplates an automatic feed regulator and a selective driving connection whereby the work may be driven or held against rotation. As in the tool actuating controls heretofore disclosed, the actuating medium for the independently operable tool holder is organized to advance and return to and from the work in timed relation with the component tools and is dependent upon the progressive operation of such tools irrespective of delay or decrement in the operating cycle.

The structure of the independently operable tool holder and control mechanism therefor embodies a cylinder 100 having a piston 101 reciprocably mounted therein to which there is connected a sleeve 102 provided at its outer end with a tapered or other suitably formed tool holder of customary structure. Fluid under pressure is admitted to the cylinder 100 through a port 103 disposed in the rearward end of the cylinder and through a port 104 in the forward end thereof. These ports communicate with a valve having a bore 105 which receives a reciprocal shuttle valve 106. The shuttle valve is formed with a central diametrically reduced portion forming heads or pistons 107 which alternately traverse and close the ports 103 and 104, respectively. In the central portion of the bore 105 there is a canal 108 which is in fluid communication with a pipe 108a connected to the conduit 19a. The shuttle valve 106 is reciprocated by a plunger 109 connected with the forward end of the valve and held in abutting engagement with a disc 110 through a spring 111 interposed between a collar 112, on the plunger 109, and a bracket 113 affixed to the sleeve 102. The disc 110 is supported on the piston shaft 56 and arranged to slide thereon and to be oscillated thereabout through a link 114 affixed upon the inner end of the shaft 58. The inner face of the disc is constructed with inclined lugs or cam blocks 115 disposed for engagement with the plunger 109 during the oscillatory movement of the disc. When the shaft 58 is oscillated the cam blocks 115 effect the reciprocative movement of the spring urged plunger 109 and thus alternately open and close the ports 103 and 104, thereby admitting fluid under pressure to the inner and outer ends of the cylinder 100 to effect the reciprocation of the piston 101.

The rate of travel during the approach and retraction of the spindle 102 to and from the work is controlled by linkage associated with a cam 116 mounted upon a collar 117 affixed to the sleeve 102. The cam 116 comprises a plate, the forward portion thereof being inclined for gradual engagement with a plunger 118. The rearward portion of the plate is formed paraxial the sleeve 102 to effect a fixed retention of the plunger 118 and constant feed of the tool during the cutting operation. The plunger 118 is formed with a tapered end portion 119 adapted for engagement with a reciprocal link 120 which is pivotally connected to a toggle 121. At the pivotal connection of the links of the toggle 121 there is a plunger 122 formed with a tapered shoulder 123 adjacent the end thereof which is disposed to engage a pawl 124 mounted upon the collar 117. The free end of the plunger 122 is provided with a roller 125 mounted laterally beyond the plane of the pawl and arranged for engagement with a cam plate 126 supported upon a sleeve 127 connected to the piston shaft 56 and movable therewith. The cam plate 126 is formed with a tapered end portion 128 which is arranged to engage the lower face of the roller and elevate the plunger 122 during the outward reciprocative movement of the piston shaft 56. The inner end of the toggle linkage 121 is connected with a push rod 129 which is united with and controls the movement of a plunger valve 130 constructed to govern the passage of the fluid expelled from the cylinder 100. The valve 130 embodies inlet and outlet ports 131 and 132, respectively, governed by a pressure balance valve 133 which in conjunction with the fluid restricting vein in the body of the inner portion of the valve 130 and the compression spring 134 limits the flow of the return fluid from the cylinder 100 and thereby cushions the inner reciprocative movement of the push rod 129.

*In operation:*—When the piston 101 is advanced outwardly toward the work holding spindle, the pawl 124, which is constructed for limited movement rearwardly, will engage the inclined surface 123 of the plunger 122 thereby dislodging the same to effect the aligned or thrust restraining position of the toggle links 121. Further movement of the sleeve 102 will cause the engagement of the cam plate 116 with the plunger 118 and the depressed movement thereof will effect the inward movement of the push rod 129 and consequent adjustment of the valve 130 to restrict the fluid escapement from the cylinder 100 through the return line 135. At this period in the operating cycle the cutting tool borne by the sleeve 102 is traversed upon the work at the desired tool cutting feed rate. Since the valvular control for the piston 101 and the piston 26 are coordinated for simultaneous operation, the sleeve 127 will be traversed outwardly at the same time the piston 101 is outwardly actuated. When the cam 128 engages the roller 125 adjacent the end travel of the piston 26, the plunger 122 will be elevated and the toggle broken, thus retracting the push rod 129 and permitting the ready escapement of fluid from the cylinder 100 to the return line 135 thereby facilitating the rapid retraction of the tool from the work.

Within the sleeve 102 there is a shaft 136 keyed to the outer portion or spindle 137 thereof and rotatively driven thereby. The inner end of the shaft 136 is provided with a pinion 138 intermeshed with a gear 139 mounted upon the shaft of the turbine 25. The rotative drive of the tool holding spindle 137 is thus effected simultaneously with the rotative movement of the shaft 24 which is arranged to drive the work holding spindle. The turbine 25 is provided with a pressure balance valve 140 and an escapement throttle 141 which governs the delivery of fluid from the turbine to the return line 142 and thereby controls the rate of rotation of the turbine impellers.

*Spindle clutches*

In the bar stock machine the spindle sleeves 80 are provided with clutches 143 disposed within the spindle turret head and as shown, arranged for exterior operative control through a bell crank arm 144. In such organization the bell cranks may be connected by suitable linkage to a cam mounted upon the shaft 40 to effect the automatic operation of the clutch. Upon actuation of the clutch the driving connection from the planetary gearing will be broken and the work will be held in a fixed position so that a cross drilling operation or milling cut may be taken thereon.

In the chucking type machine the spindles 80 may be disengaged by the operation of the clutches 143 either through automatic cam controls from the shaft 40 or through a manual operation and the chucks on the spindles may then be released so that the finished work may be removed and the rough stock loaded into the spindles.

Although the foregoing description is necessarily of detailed character, in order that the invention may be completely set forth, it is to be understood that the specific terminology is not intended to be restrictive or confining, and that various rearrangements of parts and modifications of structural detail may be resorted to without departing from the scope or spirit of the invention as herein claimed.

I claim:
1. A lathe having a multi-spindle turret, rotatable work holding spindles mounted therein, a fluid operated chuck mounted upon each of said spindles, fluid operated stock feed mechanism associated with each of said spindles, fluid operated means for indexing said turret, and fluid operated means coordinated with said indexing means and controlled by the fluid discharged therefrom for controlling the operation of said stock chucking and stock feeding mechanisms.

2. A multi-spindle lathe comprising a work holding turret, rotary spindles therein, fluid operated chucks on said spindles, fluid operated stock feed mechanisms on said spindles, a tool slide, a cylinder having a piston therein for reciprocating said tool slide and means operably controlled by the fluid displaced from said cylinder for causing the actuation of said clutch and said stock feed mechanism.

3. A multi-spindle lathe comprising a spindle turret, fluid operated means for indexing said turret, rotary spindles mounted in said turret, stock holding chucks on said spindles, stock feed mechanisms on said spindles, a cylinder, a reciprocating piston therein for consecutively operating the said chuck mechanisms during the indexing cycle of said turret, a valve for controlling the actuation of fluid to said cylinder, a second cylinder, a piston therein for consecutively operating the said stock feed mechanism, the admission of fluid to the second named cylinder being controlled by the movement of the piston in the first named cylinder.

4. A multi-spindle lathe comprising a spindle turret, fluid operated means for indexing said turret, rotary spindles mounted in said turret, stock holding chucks on said spindles, stock feed mechanisms on said spindles, a cylinder, a reciprocating piston therein for consecutively operating the said chuck mechanisms during the timed indexing cycle and a second cylinder, a piston therein for consecutively operating the said stock feed mechanisms during the turret indexing cycle, said stock feed piston being operably controlled by the movement of the piston in the first named cylinder.

5. A multi-spindle lathe comprising a spindle turret, fluid operated means for indexing said turret, a tool slide, a cylinder, a piston therein for reciprocating said tool slide, a pump having connections with said cylinder to deliver fluid under pressure thereto, rotary spindles mounted in said turret, stock holding chucks on said spindles, stock feed mechanisms on said spindles, a cylinder, a reciprocating piston therein for consecutively operating the said chuck mechanisms during the timed indexing cycle and a second cylinder, a piston therein for consecutively operating the said stock feed mechanism during the turret indexing cycle, and means controlled by the fluid displaced from said tool slide cylinder for controlling the actuation of said pistons for said chuck and stock feed mechanisms.

6. A lathe having a rotatable spindle turret, a plurality of rotary spindles therein, fluid operated chuck mechanism on said spindles, a tool slide, cutting tools mounted in said tool slide in coaxial relation with said spindles, fluid operated mechanism for reciprocating said tool slide to and from said spindles, fluid operated mechanism controlled by said tool slide for rotatively indexing said turret, and fluid operated means controlled by the fluid displaced from the tool slide reciprocating mechanism for controlling the said chuck operating mechanisms.

7. A lathe comprising a multi-spindle turret, work holding spindles therein, fluid operated driving mechanism for revolving said spindles, a tool slide, fluid operated mechanism for reciprocating said slide, a pump for circulating fluid under pressure to the spindle driving and tool slide reciprocating mechanisms and means to maintain a constant volumetric delivery of fluid to said mechanisms.

8. A lathe comprising a multi-spindle turret, work holding spindles therein, fluid operated driving mechanism for revolving said spindles, a tool slide, fluid operated mechanism for reciprocating said slide, tool carrier cross slides, fluid operated mechanism for reciprocating said cross slides, stock feed and clutch operating mechanisms, fluid operated mechanism for actuating said mechanisms, a pump for circulating fluid under pressure to the mechanisms respectively for driving the spindles, reciprocating the tool slide and cross slides and actuating the stock feed and chuck, and means to maintain a constant volumetric delivery of fluid to each of said mechanisms.

9. A lathe comprising a rotatable spindle turret, rotary spindles therein, fluid operated mechanism for driving said spindles, a tool slide coaxially reciprocal to and from said spindle turret, a fluid operated tool carrier mounted within said tool slide and fluid operated mechanism to effect the reciprocation thereof, independent of the reciprocative movement of said tool slide.

10. A lathe comprising a rotatable spindle turret, rotary spindles therein, fluid operated mechanism for driving said spindles, a tool slide coaxially reciprocal to and from said spindle turret, a fluid operated tool carrier mounted within said tool slide, fluid operated mechanism to effect the reciprocation thereof, and means coordinated with the spindle driving mechanism for rotatively driving said tool carrier.

11. A lathe comprising a rotatable spindle turret, rotary spindles therein, fluid operated mechanism for driving said spindles, a tool slide coaxially reciprocal to and from said spindle turret, fluid operated mechanism for actuating said tool slide, a fluid operated tool carrier mounted within said tool slide, fluid operated mechanism to effect the reciprocation thereof, independent of the reciprocative movement of said tool slide, and mechanism coordinated with said tool slide to effect the rate of translation of said tool carrier.

12. A lathe comprising a rotatable spindle turret, rotary spindles therein, fluid operated mechanism for driving said spindles, fluid operated means for rotatively indexing said turret, a tool slide coaxially reciprocal to and from said spindle turret, a fluid operated tool carrier mounted within said tool slide, fluid operated mechanism to effect the reciprocation thereof, and mechanism coordinated with the mechanism for indexing said spindle turret to control the reciprocation of said tool carrier.

13. A lathe comprising a multi-spindle turret, work holding spindles mounted therein, fluid operated means for rotating said spindles, fluid operated means for rotatively indexing said turret, a tool slide, fluid operated means for reciprocating said tool slide, clutches on said spindles for releasing the driving connections with said spindles, and means coordinated with the mechanism for reciprocating said tool slide for controlling the operation of said clutches.

14. In a multi-spindle lathe, a pump, a turbine in fluid communication therewith and adapted to rotatively drive said spindles, a reciprocating fluid operated tool slide having fluid communication with said pump, a fluid operated turret indexing mechanism having fluid communication with said tool slide and operatively controlled thereby and a pressure responsive valve coordinated with said pump for maintaining a constant volumetric delivery of fluid to said turbine, said tool slide and said turret indexing mechanism.

15. In a fluid operated multi-spindle turret lathe, a pump, work holding spindles in said turret fluid operated mechanism connected to said pump for rotatively driving said spindles, chucks on said spindles, fluid operated mechanism connected to said pump for operating said chucks, stock feeding mechanism, cross slides coordinated with said spindles, fluid operated mechanism connected with said pump for operating said cross slides, a tool slide aligned with said turret fluid operated mechanism connected with said pump for reciprocatively actuating said tool slide, a turret indexing mechanism coordinated with said turret, fluid operated mechanism having fluid communication with said tool slide actuating mechanism for operating said indexing mechanism, and a pressure responsive valve coordinated with said pump for maintaining a constant volumetric delivery of fluid to the aforesaid fluid operated mechanisms.

16. In a fluid operated multi-spindle turret lathe, a tool slide, fluid operated mechanism for reciprocating said slide, a turret, fluid operated mechanism for indexing said turret operatively controlled by said tool slide operating mechanism, work holder spindles in said turret, fluid operated mechanism for rotatively driving said spindles, fluid operated chucks on said spindles, fluid operated stock feeding mechanism, fluid operated cross slides, and means operable by the fluid discharged from said tool slide operating mechanism for controlling the operation of said fluid operated chucks, stock feed and cross slides.

17. In a fluid operated multi-spindle turret lathe, a tool slide, fluid operated mechanism for reciprocating said slide, a turret, fluid operated mechanism for indexing said turret operatively controlled by said tool slide operating mechanism, work holder spindles in said turret, fluid operated mechanism for rotatively driving said spindles, chucks on said spindles, fluid operated mechanism for actuating said chucks, stock feeding mechanism, fluid operated mechanism for actuating said stock feed mechanism and controlled by said chuck actuating mechanism and means operable by the fluid discharged from said tool slide operating mechanism for controlling the operation of said chuck and cross slide operating mechanisms.

18. In a multi-spindle turret lathe, fluid operated mechanism for rotatively driving said spindles, a reciprocating tool slide, fluid operated actuating mechanism therefore, cross slides, fluid operated actuating mechanism therefor, a turbine for indexing said turret, fluid connections between said turbine and said tool slide actuating mechanism, a valve connected with said turbine and adapted to control the fluid discharged therefrom, mechanism coordinated with said tool slide for controlling the operation of said valve, and means controlled by the fluid discharged from said tool slide actuating mechanism and said turbine for controlling the operation of said cross slides.

19. A lathe comprising a bed, a rotatable spindle turret mounted thereon, a reciprocable tool slide mounted on said bed in co-axial alignment with said turret, a cylinder mounted upon said bed, a piston therein, a hollow connecting rod joining said piston with said tool slide, a fluid pump in said bed, a fluid turbine mounted upon said bed adjacent said cylinder, fluid connections intermediate said pump and said turbine, a shaft connected with said turbine and extending through said connecting rod, a gear upon said shaft, pinions upon said turret spindles intermeshed with said gear for rotatively driving said spindles simultaneously, a valve for controlling the flow of compressed fluid to said cylinder, means for reciprocating said tool slide, fluid operated means for indexing said turret, said fluid operated indexing means and said valve being coordinated for automatic control, and linkage associated with said tool slide for operatively adjusting said indexing mechanism.

20. A lathe comprising a multi-spindle turret, work holding spindles therein, fluid operated driving mechanism for revolving said spindles, a tool slide, fluid operated mechanism for reciprocating said slide, fluid operated mechanism for rotatively indexing said turret, a cam rotatively operable by the reciprocation of said tool slide, a shaft connected with said cam, a valve operably adjustable by said shaft, a fluid operated turbine for rotatively indexing said turret, said valve being arranged in the discharge line from said turbine and adapted to cause the operation of said turbine upon operation of said valve.

21. A lathe comprising a multi-spindle turret, work holding spindles therein, fluid operated driving mechanism for revolving said spindles, a tool slide, fluid operated mechanism for reciprocating said slide, a fluid operated tool carrier mounted within said tool slide, fluid operated mechanism to effect the reciprocation thereof, a cam mounted on said tool carrier and reciprocable therewith, a plunger operably connected with said cam, a valve coordinated with said mechanism for effecting the reciprocation of said tool carrier, linkage intermediate said plunger and said valve for effecting the adjustment thereof, said cam being formed to control adjustment of said valve so that a relatively high volumetric delivery of fluid will be admitted to said tool carrier fluid operated mechanism upon the initial translation of said cam and the flow of fluid will be restrained within the latter portion of travel of said cam.

22. A lathe comprising a rotatable spindle turret, rotary spindles therein, fluid operated mechanism for driving said spindles, a tool slide coaxially reciprocal to and from said spindle turret, a fluid operated tool carrier mounted within said tool slide, fluid operated mechanism to effect the reciprocation thereof, and means coordinated with said tool carrier and said fluid operated reciprocating mechanism to vary the speed of translation thereof.

23. A lathe comprising a rotatable spindle turret, rotary spindles therein, chucks mounted upon each of said spindles, fluid operated mechanism for driving said spindles, fluid operated mechanism for rotating and indexing said turret, fluid operated stock feed mechanism for advancing the stock through said spindles, fluid operated chuck actuating mechanism, an arm connected with said stock feed mechanism for engaging one of said spindles during a period in the indexing cycle to effect the advancement of the stock through the spindles engaged by said arm, and an arm mounted upon said chuck actuating mechanism for engaging one of the spindles during a period in the indexing cycle for effecting the actuation of the chuck engaged by said arm.

HARRY W. RUPPEL.